Jan. 12, 1960 A. A. COLLINS ET AL 2,921,271
TRANSMITTER STABILIZER
Filed Feb. 6, 1957
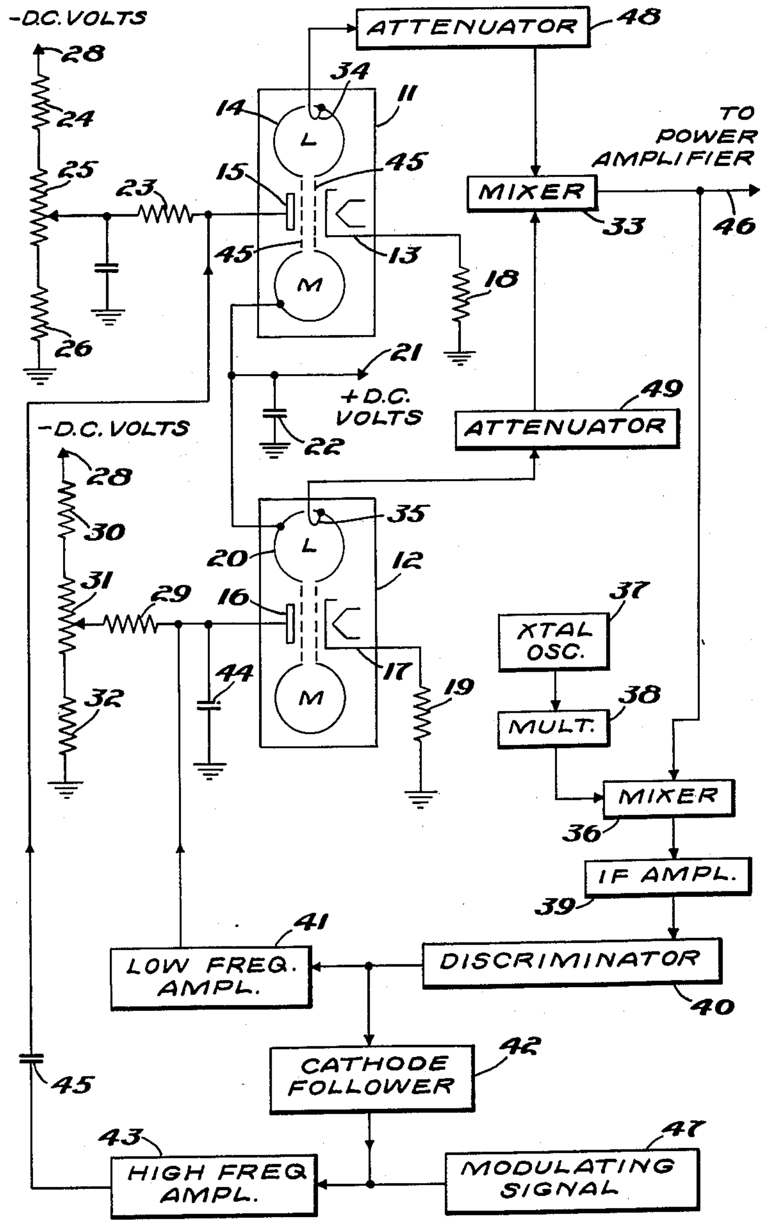
INVENTORS
ARTHUR A. COLLINS
ROBERT M. MITCHELL
VEIKKO R. SAARI
BY Marvin Moody
ATTORNEY 2,921,271

TRANSMITTER STABILIZER

Arthur A. Collins and Robert M. Mitchell, Cedar Rapids, Iowa, and Veikko R. Saari, Summit, N.J., assignors to Collins Radio Company, Cedar Rapids, Iowa, a corporation of Iowa Application February 6, 1957, Serial No. 638,601

1 Claim. (Cl. 332—7)

This invention pertains to high-frequency modulator-exciters and particularly to modulator-exciters that have control circuits for stabilizing frequency of the output signal and for improving modulation characteristics.

Control systems of this invention are particularly applicable to oscillators that utilize reflex klystron vacuum tubes. Klystron oscillators must be stabilized when used in reliable microwave communication circuits, because unstabilized oscillators using klystrons develop signals that are noisy and change frequency readily with changes in temperature, voltage, and humidity.

An object of the present invention is to provide high-frequency modulator-exciters with control circuits that decrease frequency drift and reduce noise.

Another object is the utilization of the improved control circuit with a heterodyne circuit to provide improved modulation characteristics.

The description of the modulator-exciter of this invention and the appended claims may be more readily understood with reference to the single figure in which a klystron modulator-mixer and its improved feedback control circuit are shown in a combined schematic and block diagram. In general, the modulator-exciter shown in the accompanying figure is a heterodyne circuit that includes two klystron microwave oscillators and a mixer. Each of the two oscillators supplies a microwave signal of a different frequency to the mixer. The two singals are heterodyned in the mixer to develop a signal that has a frequency which is the difference between the frequencies of the two signals. Through the use of a heterodyne circuit, small klystron tubes that can be placed in a compact assembly may be used to develop signals at frequencies lower than those that are within the normal tuning range of these oscillators. A single klystron tube for direct operation at these lower frequencies would be large and unwieldy and an oscillator using a single tube could be expected to have less desirable electrical and thermal characteristics than the heterodyne oscillator. Also, use of a heterodyn ecircuit permits one of the two klystron oscillators of the circuit to be used to compensate for drift-in frequency in the output line, while the other klystron oscillator is operated at optimum frequency and voltage for obtaining good modulation characteristics. The feedback control circuit is connected between the output line of the modulator-exciter and control electrodes of the oscillators. This control circuit is divided into a low-frequency channel and a high-frequency channel that are connected individually to the repellers of the two oscillators. The phase characteristics of the channels are such that the control voltages applied to the repellers substantially eliminate, in the output circuit of the modulator-exciter, undesirable frequency changes caused by inherent instability of klystron tubes. The high-frequency channel provides negative feedback in the modulation circuit to provide linear operation for reducing distortion.

The two oscillators that produce signals that are to be heterodyned in the mixer include klystron vacuum tube 11 and klystron vacuum tube 12. The construction of these tubes is conventional. For example, tube 11 has cathode 13, repeller 15, and re-entrant cavity 14. The re-entrant cavity has the usual pair of grids 45. The cathode 13 of tube 11 and the cathode 17 of tube 12 are connected to ground through cathode resistors 18 and 19, respectively. Re-entrant cavities 14 and 20 are connected to positive terminal 21 of a direct-current voltage source. A by-pass capacitor 22 is connected between the cavities and ground. Each of the repellers is connected through a resistive voltage divider to a source of negative direct-current voltage. Repeller 15 of tube 11 is connected through isolating resistor 23 to the arm of potentiometer 25 which is connected in series with resistors 24 and 26 to form a voltage divider between negative terminal 28 and ground. Likewise, repeller 16 of tube 12 is connected through the filter resistor 29 to the arm of potentiometer 31. The potentiometer 31 is connected in series with resistors 30 and 32, and the series circuit is connected between ground and terminal 28 of the direct-current voltage source.

The arm of each of the potentiometers 25 and 31 is adjusted to provide required negative voltage on the respective one of the repellers 15 and 16 for tuning the respective oscillator to a desired frequency. For optimum operation, the dimensions of the cavities should be chosen such that greatest output is obtained at the operating frequencies. For example, if the frequency of the signal in the output circuit of the modulator-mixer is to be 800 megacycles, the cavities of the klystron tubes should provide maximum output at frequencies that differ by 800 megacycles.

Coupling loop 34 of cavity 14 is connected through fixed attenuator 48 to one input circuit of mixer 33, and coupling loop 35 of cavity 20 is connected through fixed attenuator 49 to the other input circuit of mixer 33. The fixed attenuator isolate the klystron oscillators from the mixer in order to prevent interaction between the two oscillators. The oscillator signals are heterodyned in mixer 33 to provide a signal with a difference frequency in the modulator-exciter output circuit which may be connected, for example, to transmitting circuits.

The feedback control circuit includes mixer 36 which has one input circuit connected to output line 46 of the modulator-mixer and another input circuit connected to a reference source of signal having stable frequency. The source of reference signal may be, for example, crystal oscillator 37 and frequency multiplier 38. The control circuit constantly compares the frequency of the signal on output line 46 with the frequency of the reference signal and is responsive to departure in frequency of signal on output line 46 to develop a control voltage for stabilizing the frequency of the output signal. The stability of the sytsem approaches that of the reference signal and is particularly good when a temperature-regulated crystal is used. The frequency of the standard reference signal is selected for obtaining an intermediate frequency in the control circuit which is the difference between the frequencies of the output signal on line 46 and the reference signal. The intermediate frequency circuit extends from the mixer through intermediate frequency amplifier 39 to discriminator 40.

The mixer, I.-F., and the discriminator circuits are conventional. For example, the I.-F. amplifier 39 may consist of several broadly-tuned cascade stages having sufficient bandwidth to cover the frequency range of the modulating signal and its significant sidebands. The I.-F. amplifier must have a bandwidth broad enough to pass without phase shift all variations in the modulating signal which is applied to the modulated oscillator. Excessive phase shift at any frequency within the operating band of the high-frequency feedback circuit causes undesirable positive feedback voltage to be applied to the repeller of the modulated oscillator and results in spurious oscillation.

Discriminator 40 may include a pair of diodes in a circuit that is tuned to provide zero output voltage at an intermediate frequency which is derived from the center frequency of the signal in the modulator-exciter output. The discriminator is responsive to a variation in frequency from the center frequency to produce a control voltage. The polarity of the control voltage is determined by the direction of departure of the frequency change from the center frequency, and the magnitude is determined by the extent of the deviation therefrom.

The output circuit of discriminator 40 is divided into two channels. One channel includes a low-frequency amplifier 41, and the other includes cathode follower 42 and high-frequency amplifier 43. The output of low-frequency amplifier 41 is connected to repeller 16 of klystron vacuum tube 12. Capacitor 44 is connected between repeller and ground to effectively by-pass signals having frequencies higher than approximately 50 cycles per second. Low-frequency components of the control voltage are applied in required phase to repeller 16 to substantiallly eliminate frequency drift in the output circuit of the modulator-exciter.

Control voltage within a frequency band corresponding to that of the modulating frequencies is applied through high-frequency amplifier 43 and capacitor 45 to repeller 15 of klystron vacuum tube 11. Direct-current and low-frequency variations are blocked from repeller 15 by coupling capacitor 45 and by coupling capacitors in amplifier 43. The phase characteristics of the high-frequency channel provide voltage to repeller 15 in proper phase for canceling noise and high-frequency variations in the output circuit of the mixer modulator.

The crossover point in the frequency response of the low-frequency channel and the high-frequency channel is not critical. For example, the bandpass of the low-frequency channel may extend from 0 to 50 cycles per second, and the response of the high-frequency channel may extend from 50 cycles per second to several octaves above the bandwidth of the modulating frequency. It is, however, important that the gain vs. frequency characteristics of the system be uniform in the vicinity of the crossover between the low- and high-frequency signals.

The gain of each of the control channels may be selected independently for obtaining good stability. The low-frequency amplifier is a direct-coupled amplifier and has relatively high gain for reducing frequency drift and low-frequency hum from power lines to a low level. The gain of high-frequency amplifier 43 may be relatively low compared with that of the direct-current amplifier in order to reduce the possibility of regeneration due to phase shift at high modulating frequencies.

The source of modulating signal 47 is connected to high-frequency amplifier 43 for modulating klystron oscillator 11 through application of the modulating voltage to repeller 15. A separate amplifier for modulating the klystron may be used when applicable.

In operation, the phasing of the feedback circuits depends upon the relative frequencies of the two oscillators and upon whether the frequency of the reference source is operating at a lower or at a higher frequency than the frequency of the signal in the output circuit of the modulator-exciter. As an example, if it is assumed that an oscillator using klystron tube 11 is operating at a frequency of 5,800 megacycles and that the frequency of the oscillator utilizing klystron vacuum tube 12 is operating at a frequency of 5,000 megacycles, the difference frequency of the heterodyne signal appearing in output line 46 is 800 megacycles. Also, assume that the frequency of I.-F. amplifier 39 is 60 megacycles and that the frequency of the stable reference signal applied to mixer 36 is 740 megacycles. In the event that the output frequency should drift to a frequency somewhat higher than 800 megacycles, the frequency could be returned to 800 megacycles by applying higher negative voltage to repeller 16. Application of higher negative voltage would raise the operating frequency of klystron tube 12 above 5,000 megacycles so that the frequency difference between the two oscillators is reduced. In the control circuit, a higher intermediate frequency for application to the discriminator is developed in response to deviation of the output frequency from 800 megacycles to a slightly higher frequency. Discriminator 40 is responsive to application of signal with higher frequency for developing a control voltage which is of proper polarity when applied through low-frequency amplifier 41 to increase the negative voltage applied to repeller 16. Obviously, at other times when the signal in the output circuit tends to become lower in frequency, the voltage of opposite polarity is developed by discriminator 40 to reduce the negative voltage that is applied to repeller 16. Therefore, operation of the control circuit produces control voltage of required polarity for substantially canceling drift-in frequency in the output circuit. In a like manner, control voltage and modulating voltages of opposite phases are applied through the high-frequency channel to repeller 15. The application of control voltage from the high-frequency channel substantially eliminates noise originating in the klystron oscillator circuits.

Good modulating characteristics are obtained by using two klystron oscillators in a heterodyne arrangement. A minimum of distortion in the output line is obtained when the klystron tube that is being modulated is operated at an optimum frequency as determined by the dimensions of its cavity and the voltages applied to the tube electrodes. Obviously, in the circuit described herein, the control voltage for eliminating frequency drift is not applied to that klystron to which modulating signal is applied. In order to change operation of the system from one center frequency to another, cavity 20 of the oscillator that is controlled by the low-frequency channel, may be adjusted for obtaining a new difference frequency at the output circuit of mixer 33. Then the crystal of crystal oscillator 37 is changed for maintaining the frequency in the I.-F. control circuits at the same predetermined value. In this manner the center frequency of the output signal of the system is changed without upsetting the optimum conditions for modulation within the circuit that includes klystron tube 11. Another advantage of using two klystrons in a heterodyne arrangement is that frequency variations due to temperature and humidity changes are substantially reduced because the variations are applied to both tubes simultaneously. Since these variations will tend to cause both klystron oscillators to change frequency in the same direction, the difference frequency will vary less than that obtained from a single klystron oscillator circuit. Therefore, the range of control required by the low-frequency control channel is reduced considerably over that which would be required for a klystron oscillator utilizing a single tube.

Although this invention has been described with respect to a particular embodiment thereof, it is not to be so limited as changes and modifications may be made therein which are within the full intended scope of the invention as defined by the appended claim.

What is claimed is:

In combination a high-frequency modulator-exciter and a feedback control circuit, said feedback control circuit having a low-frequency channel for stabilizing the carrier frequency of said modulator-exciter and a high-frequency negative feedback channel for reducing noise and distortion in the output of said modulator-exciter, said modulator-exciter comprising first and second klystron oscillators and a mixer, said first and second klystron oscillators having first and second repellers and first and second output circuits respectively, first and second frequency controlling circuits connected to said first and second repellers respectively, means for applying a modulating signal to said first repeller to modulate the signal generated by said first oscillator, said first and second output circuits being connected to said mixer for applying modulated signal and unmodulated signal respectively to said mixer, said feedback control circuit having an input connected to said mixer for receiving heterodyned signal therefrom, said feedback control circuit including discriminator means having stable frequency characteristics for demodulating said heterodyned signal to provide signal components corresponding to said modulating signal with the addition of unavoidable noise and distortion components and also to provide low-frequency signal components corresponding to frequency drift, said discriminator means being connected through said high-frequency channel to said first repeller for applying modulating components of said discriminator signal in proper phase with said first oscillator for reducing distortion and noise, said high-frequency channel including a serially connected blocking capacitor for passing high-frequency voltages over a frequency range that includes the frequencies of said modulating signal, and said discriminator means being connected through said low-frequency channel to said second repeller for applying low-frequency control signal components to said second oscillator for stabilizing said carrier frequency.

References Cited in the file of this patent

UNITED STATES PATENTS

| | | |
|---|---|---|
| 2,182,790 | Craft | Dec. 12, 1939 |
| 2,245,627 | Varian | June 17, 1941 |
| 2,334,726 | Rankin | Nov. 23, 1943 |
| 2,394,393 | Mayer | Feb. 5, 1946 |
| 2,404,852 | Koch | July 30, 1946 |
| 2,755,383 | Mannheimer | July 17, 1956 |
| 2,888,646 | Ringoen | May 26, 1959 |